United States Patent
Dahl et al.

[11] 3,883,081
[45] May 13, 1975

[54] APPARATUS FOR SHREDDING BALEFORMED COMPRESSED FIBER MATERIAL

[75] Inventors: Birger Dahl, Sarpsborg; Arne Ludvig Hannestad, Fredrikstad, both of Norway

[73] Assignee: Aktieselskapet Borregaard, 1700 Sarpsborg, Norway

[22] Filed: Feb. 12, 1974

[21] Appl. No.: 441,829

[30] Foreign Application Priority Data
Feb. 14, 1973 Norway................................. 599/73

[52] U.S. Cl................. 241/281; 83/418; 214/1 BB; 214/1 Q; 214/6 C; 241/293
[51] Int. Cl............................................. B02c 23/02
[58] Field of Search............ 241/223, 277, 280, 281, 241/282, 293; 83/418; 198/237; 214/6 C, 1 Q, 1 BB

[56] References Cited
UNITED STATES PATENTS

| | | | |
|---|---|---|---|
| 2,792,183 | 5/1957 | Fasching et al. | 241/277 X |
| 3,070,240 | 12/1962 | Barriol | 214/6 C |
| 3,215,356 | 11/1965 | Meinecke et al. | 241/281 |
| 3,654,977 | 4/1972 | Benno | 241/277 |
| 3,675,788 | 7/1972 | Cathers | 214/1 Q |
| 3,749,326 | 7/1973 | Aro | 241/281 X |
| 3,795,323 | 3/1974 | Ouska | 214/1 Q |

FOREIGN PATENTS OR APPLICATIONS
916,292   8/1954   Germany ........................... 241/293

Primary Examiner—Roy Lake
Assistant Examiner—Howard N. Goldberg
Attorney, Agent, or Firm—Wenderoth, Lind & Ponack

[57] ABSTRACT

A bale shredding apparatus for disintegrating the compactly pressed fiber material in bales of flash dried wood pulp and the like, by feeding the bales against a rotating shredding cylinder. During part of the feeding and shredding operation each bale is held in a positive grip between two movable clamping plates forcing the bale into contact with the shredding cylinder while preventing premature splitting of the bale.

9 Claims, 6 Drawing Figures

APPARATUS FOR SHREEDING BALEFORMED COMPRESSED FIBER MATERIAL

BACKGROUND OF THE INVENTION

This invention relates to an apparatus for dry shredding or disintegrating dried and compactly compressed fiber material in the form of bales, e.g. chemical or mechanical wood pulp and the like. The invention is specifically intended for the treating of such bales emerging as the final product in a so-called "flash" drying process, i.e., a process where the moist fiber material is blown through a drying plant reducing its moisture content from about 55 percent to about 10 percent. The dried fiber material in the form of small particles or flakes is very voluminous, and in a hydraulic press it is compressed into compact slabs, which are then stacked and pressed anew in a so-called bale press into bales forming the basic product for further refining of the fiber material. Each bale is thus composed of a plurality, e.g. four, layers or slabs of compressed compact fiber material which adhere to each other in a relatively loose relation along planes normal to the direction in which they were compressed. Owing to the pressing action the fibers have acquired a certain orientation normal to the press direction, i.e. parallel with the layer or slab interfaces, giving the so-called split direction of the bale. The bales have generally the form of a right-angled parallalepiped of which the larger surfaces are parallel to the slab faces.

Flash drying of wood pulp and the like is a relatively recently developed process which in the wood pulp industry all over the world to an increasing extent replace the less efficient drying process, where the pulp is dried on a socalled Fourdrinier into a continuous relatively thin, easily disintegrated sheet, which either is delivered in the form of rolls or is cut into smaller sheets which are made up into bales for transport and further refining.

When refining wood pulp and the like the basic material is generally dissolved or defibered by mechanical and/or chemical means in a pulper. The dissolving of flash dried bales of wood pulp intended for paper production has not brought any particular problems for larger paper mills, as the bales quite easily dissolve in water in the dissolving plant of the mill. However, within certain refining industries converting to the new flash dried bale type may lead to problems, because the existing plants for dissolving and defibering the raw material are designed for pulp in the form in which it was previously delivered as mentioned above. For instance the dissolving plants in smaller paper mills will generally not stand the load of a full bale or full slab of flash dried pulp. The problem is of particular importance in industry producing artificial silk, cellophan or the like, where the basic material is so-called dissolving pulp. The first step in the further treating of this pulp consists in dissolving it in lye. However, a wood pulp bale is not as easily dissolved in lye as in water, and the introduction of full bales or slabs in small continuously working pulpers designed for dissolving sheets would result in an unacceptable variation of the consistency. Thus if flash dried wood pulp is to be used in this industry, each bale must be disintegrated into units which are sufficiently small to secure a uniform and continuous flow of wood pulp to the dissolving plant in order to avoid consistency variations. Other factories employ wood pulp for the production of dry, cotton-like pulp, to be used for example in sanitary napkins or in disposable babies napkins. At present these factories can only use wood pulp in the form of sheets or rolls which are disintegrated into small units in so-called fluffers. Also in this case flash dried raw material requires an apparatus which can shred the pulp bales into the same consistency as that of the fluffers.

Thus there exists a demand within the above industries, for a device or a machine which is able to disintegrate the flash dried bales into small, substantially equisized particles, prior to the further treatment in the existing plant. In spite of several attempts up to the time of the present invention no one has succeeded in constructing a satisfactorily working apparatus of this kind, and hence, in spite of the obvious advantages of flash dried wood pulp, such pulp is not yet adpoted by industries of the above-mentioned type.

Previously known devices for disintegrating other types of compressed material formed into bales, such as cotton bales, hay bales, etc., as well as known apparatus for disintegrating sheet-formed, conventionally dried wood pulp, are quite unusable for disintegrating the compact slabs in bales from flash dried wood pulp, mainly because the latter material required substantially heavier forces for the feeding, supporting and disintegrating of the bales, which also must be prevented from splitting laterally.

However, most of the previous attempts to solve the above problem are also based on pressing each bale against a shredding tool provided with spikes, teeth, knives, etc., which are moving relatively to the bales. By these attempts such relative movements have generally been transverse to the slab interfaces, i.e. transverse to the split direction of the bale because it was natural to feed and support the bale horizontally on one of the larger bale surfaces while the disintegrating tool penetrated the slabs in a vertical direction. By this arrangement the bale was supported in its most stable position and in such a way that the slabs did not fall apart. However, the results of these attempts were quite unsatisfactory. An unduly large power consumption was experienced and remaining bale slices tended to wedge in the apparatus resulting in machine stops. The bales were also continuously sprayed with lye in order to soften them prior to the shredding, but these experiments were not very successful as the rate at which the lye penetrated into the bales was too slow. It also prooved problematic to construct a satisfying feeding device, ensuring a continuous bale feeding and at the same time supporting each bale steadily during the shredding process so that the bale did not separate in the split direction and so that the rear portion of the bale is shredded in a uniform manner during the transition to the next bale.

Also other principles for disintegration have been tried in an attempt to solve the problem. For instance the bales have been introduced between vibrating plates which in the first hand lead to satisfactory disintegration. However, after a while the disintegrated pulp absorbed all vibration and thus prevented further disintegration. Finally, an apparatus has been proposed in which the flash dried bales are twisted and thereby parted into relatively large pieces. However, this apparatus is very voluminous and expensive, and it may not be placed directly in connection with an existing dissolving plant without further installations. Neither is it possible to transport the separated pulp from this appparatus pneumatically or as a slurry.

SUMMARY OF THE INVENTION

It is thus an object of the present invention to provide an apparatus for shredding bales of flash dried fiber material which by acceptable power consumption ensures a uniform and continuous supply of substantially equisized pieces which may be fed directly into conventional pulpers or defibrators.

A further object is to provide an apparatus permitting exact control of the amount of shredded material from apparatus, and control of the size of the individual particles in the disintegrated fiber material.

Another object of the invention is to provide a simple, steady and compact apparatus which either may be disposed direct in connection with existing plant for further treatment of the shredded pulp, or provides possibilities for various forms of transport of the shredded pulp.

According to the invention these objects are primarily achieved by an apparatus where the bales of the introductorily mentioned type are fed in abutting relation through guiding means into direct contact against a rotating and toothed cylinder, such apparatus comprising a pair of clamping means oppositely located on each side of the bale path near the shredder cylinder, such clamping means being connected to a drive for reciprocating movement in opposite directions transversly of the bale path and reciprocating common movement longitudinally on the bale path.

By this favourable arrangement each bale is clamped across the slab interfaces and supported in a steady grip between the clamps during the initial and longest phase of bale contact against the shredding cylinder, the clamps preventing the bale from being separated by the splitting effect of the shredding teeth, which otherwise would prevent any further guided feeding of the bale against the cylinder. When the greater part of the bale is accommodated in the bale guides the bale is released from the clamps which are no longer required as the remaining bale part is held together by bale guides during the final shredding operation when the succeeding bale under the action of the clamps press against the remaining bale part of the preceding bale.

In a preferred embodiment of the apparatus according to the invention the axis of the shredding cylinder is disposed parallel to the clamping direction of the clamps, whereby the bales during the shredding operation are oriented in such a way that the shredding teeth of the cylinder penetrate into a bale parallelly to the slab interfaces and the split direction of the bales. This arrangement of the feed direction relative to the movement of the cylinder teeth penetrating the bale has prooved very advantageous as compared to the previous attempts of shredding the bales perpendicularly to the split direction. A much more even shredding of the bale is obtained and the power consumption of the shredding cylinder may be substantially lowered. This is due to the fact that the fibres are more easily separated from the adjacent fibres when they are subject to forces acting parallel to the split direction than when the forces are acting normal to this direction. Another favourable feature of the invention is that the size of the shredded pieces may be controlled within certain limits. Thus, too small pieces involving the risk of dust explosion are omitted, as well as too large pieces which may result in mechanical damage of a possible system for further transport of the shredded pulp. Also the apparatus according to the invention allows an exact control of the rate of shredded fiber material discharged from the apparatus, so that undesired variations in consistency in the subsequent processes are prevented.

BRIEF DESCRIPTION OF THE DRAWING

Further objects and advantages of the apparatus according to the invention will be apparent from the following description in connection with the accompanying drawings which partly diagrammtically illustrate an embodiment of the invention, and wherein.

DETAILED DESCRIPTION OF THE INVENTION

Figure 1:
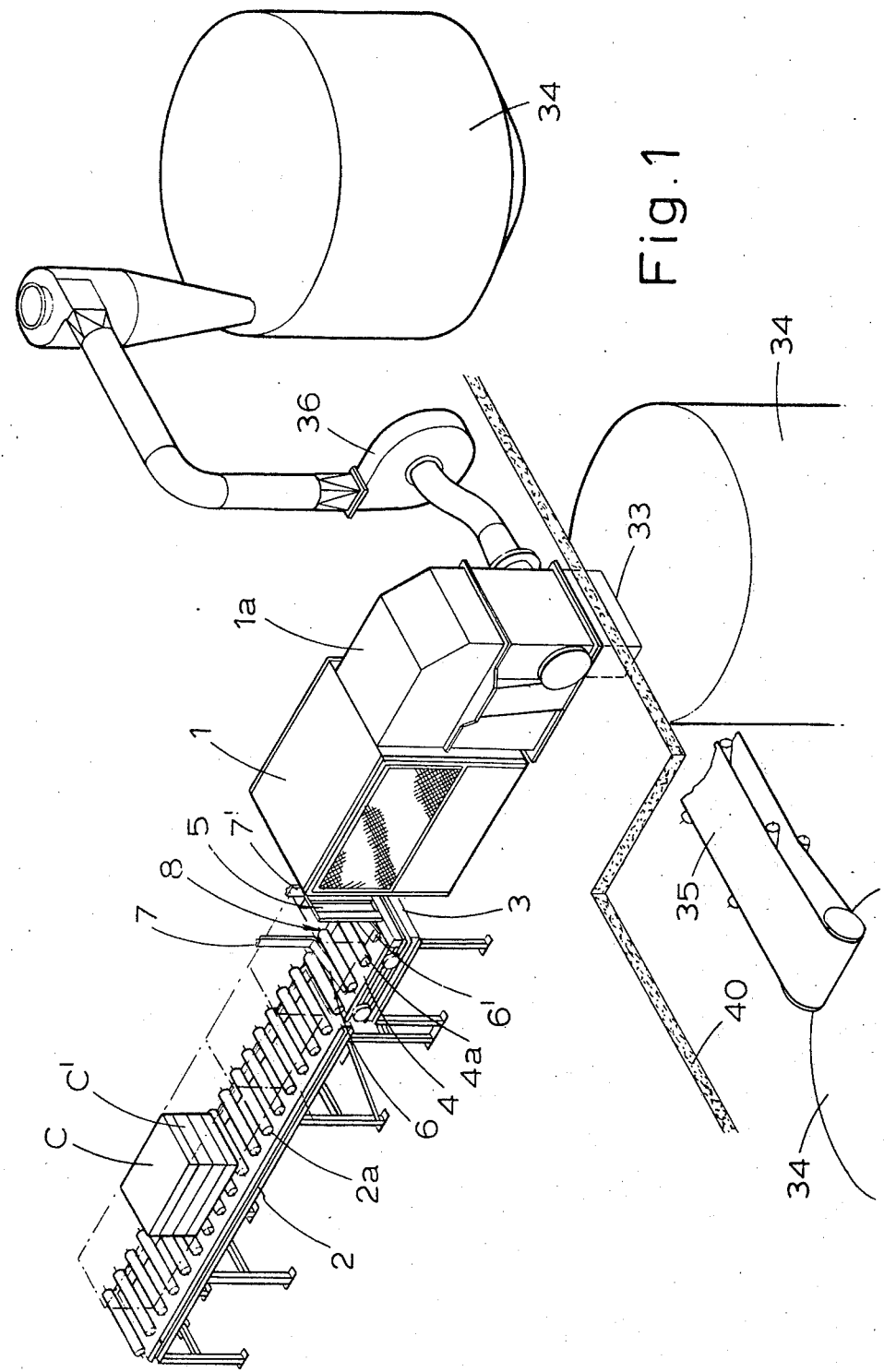
FIG. 1 is a perspective view of an arrangement in which the apparatus according to the invention has been shown in connection with the accompanying machinery.
Figure 3:
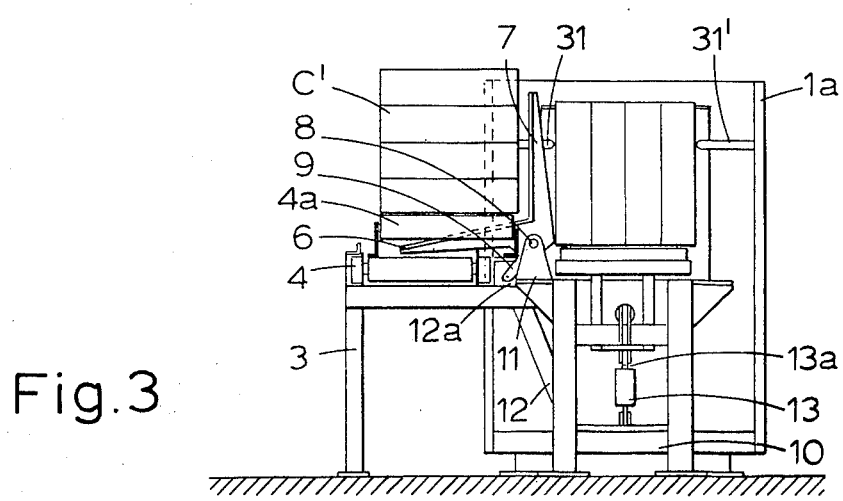
FIG. 3 is a diagrammatic end view of the apparatus of FIG. 2 as seen in the feed direction.

Referring to the FIG. 1, item 1 generally denotes an apparatus according to the invention, suitably accomodated in a casing 1a. Item 2 is a conveyor, e.g. a roller conveyor with rolls 2a on which the bales C are fed in a continuous abutting row as indicated by phantom lines. The longitudinal axis of the conveyor 2 is staggered relative to the longitudinal axis of the apparatus 1. On a support 3 in continuation of the conveyor 2 at the discharge end thereof is located a longitudinally movable separating wagon 4 having rolls 4a which are flush with the rolls 2a of the conveyor 2, and a bale stop 5 at its end adjacent the apparatus 1. Items 6,6', 7 and 7' are four rigidly interconnected tilting arms arranged in pairs in two planes intersecting each other by an angle of approximately 100°, the arms 6 and 6' as illustrated in FIG. 1 being lowered in a first position between the rolls 4a below the bale C on the wagon 4, while the arms 7 and 7' are directed vertically upwards. The arms 6,6', 7 and 7' are rigidly connected to a shaft 8 turnably journalled parallel to the longitudinal axis of the apparatus 1 in bearings 11 on the frame 10 of the apparatus, as is best seen from FIG. 3. Rigidly connected to the shaft 8 and radially projecting therefrom is also a lever 9 which at its remote end is connected to the piston rod 12a of an hydraulic cylinder 12 pivotably supported in the frame 10. Activating the cylinder 12 causes the tilting arms 6,6', 7 and 7' to rotate 90° between their said first position as shown in FIG. 1, to a second position therein the top surfaces of the arms 7 and 7' are located in a horizontal plane flush with the top surfaces of the free rolls 14a in a horizontal roller conveyor 14 at the inlet end of the apparatus 1.

Figure 2:
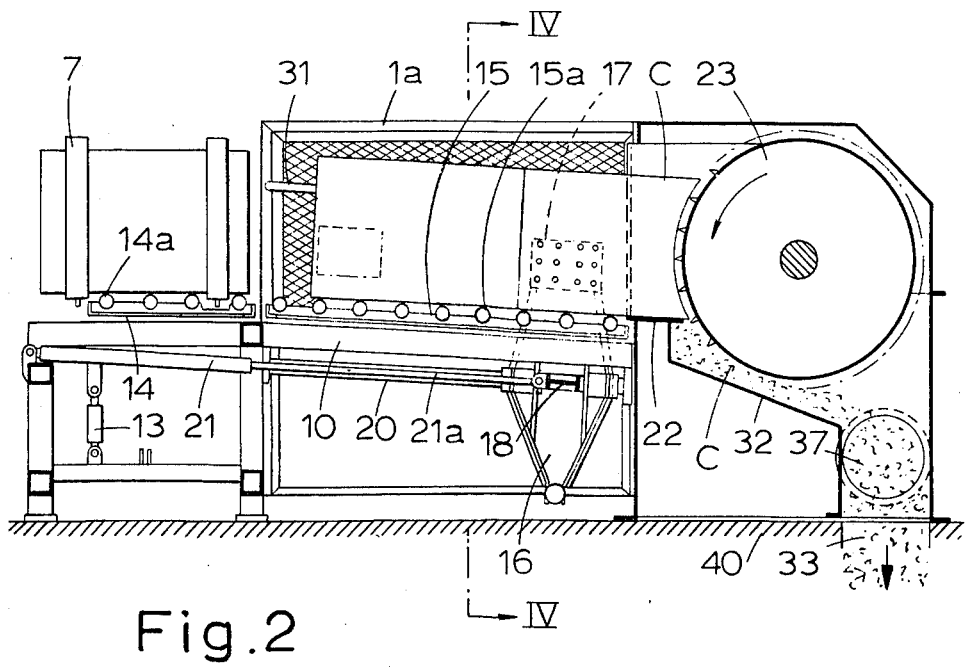
FIG. 2 is an enlarged diagrammatic longitudinal section of the apparatus according to the invention with some parts removed.

As best seen from FIG. 2 one end of the roller conveyor 14 is pivotably supported at the upper end of a sloping roller conveyor 15 having free rolls 15a, which is supported on the frame 10 and leads into the interior of the apparatus 1. The underside of the conveyor 14 near its remote end is connected to the piston rod 13a of a substantially vertically directed hydraulic cylinder 13 pivotably supported in the frame 10. "Plus" movement of the piston rod 13a elevates the remote end of the conveyor 14 until the latter is in alignment with the sloping conveyor 15.

Figure 4:
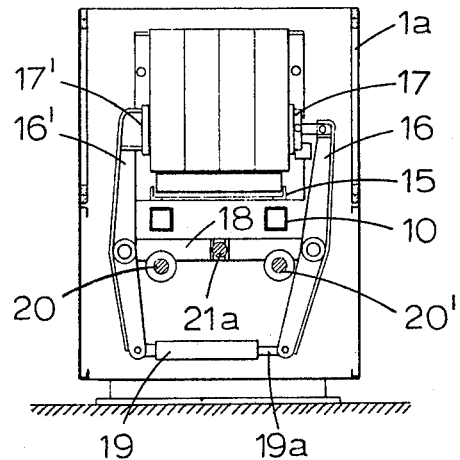
FIG. 4 is a section taken along the lines IV—IV of FIG. 2.

Oppositely disposed on each side of the conveyor 15 are two clamping arms 16 and 16' having clamping plates 17 and 17' extending above the conveyor 15. As best seen from FIG. 4 the clamping arms are pivotably supported in a crossbar 18 located below tthe conveyor 15 and the frame 10. The lower ends of the clamping arms are interconnected via a hydraulic cylinder 19, the arm 16 being pivotably connected to the piston rod 19a of the cylinder while the arm 16' is pivotably connected to the cylinder bottom end. Activating the cylinder 19 thus causes the clamping plates 17 and 17' to move toward each other and away from each other laterally of the conveyor 15. The crossbar 18 is slidably mounted on two guiding rods 20 and 20' extending parallelly to the conveyor 15, and together with the arms 16 and 16' it is movable in a reciprocating manner longitudinally of the conveyor 15 by means of a hydraulic cylinder 21 longitudinally mounted centrally below the conveyors 14 and 15 in the frame 10, the piston rod 21a being pivotably connected to the crossbar 18. It should be noted that the actual mounting and guiding of the crossbar 18 and the clamping arms, and their interconnection may be effected in several ways. For example the clamping arms 16 and 16' may be pivotably and slidably mounted directly on the guiding rods 20 and 20'.

Figure 5:
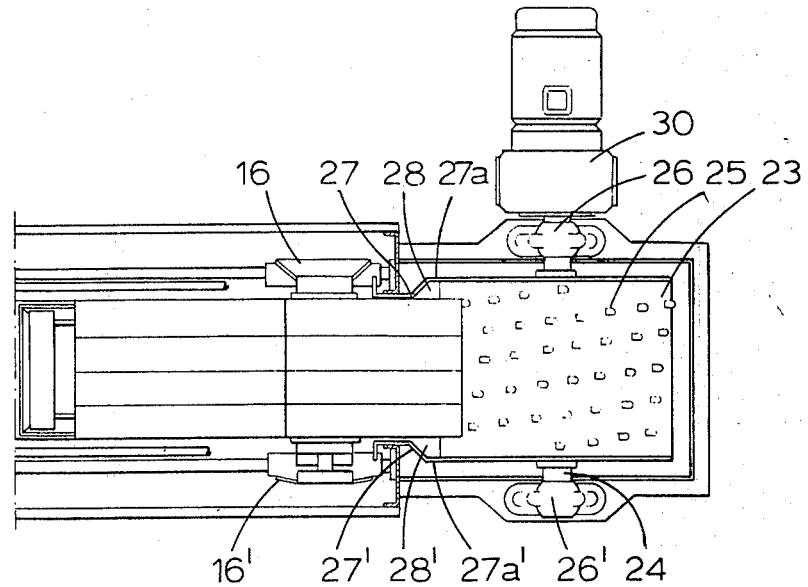
FIG. 5 is a diagrammatic fractional top view of the apparatus of FIG. 2 in which the upper part of the casing is removed.

At the lower end of conveyor 15, between the sidewalls 1a of the casing a supporting plate 22 is disposed parallel to and flush with the top surface of the rolls 15a. A rotatable cylinder 23 having a shaft 24 is horizontally journalled in bearings 26 and 26' (FIG. 5) supported on the outside of the casing 1a, the axis of the cylinder being parallel to the rolls 15a of the conveyor 15. The axial length of the cylinder 23 is somewhat wider than the axial length of the rollers 15a. The shredding teeth 25 are rigidly attached to the cylinder 23 in a uniform double helical pattern as illustrated in FIG. 5. The cylinder 23 is located relative to the supporting plate 22 such that the edge of the latter is parallel to the cylinder at a level about midway down on the lower cylinder half, allowing a narrow clearance for the shredding teeth 25. The shredder cylinder may be driven by an electric motor 30.

Two opposite, vertical bale guide plates 27 and 27' are located at the supporting plate 22 at the end of the conveyor 15, the spacing between the opposite parallel surfaces of the guide plates corresponding to the width of the bales C with a certain additional clearance. In a preferred embodiment of the invention each guide plate 27 and 27' is formed with a laterally bended or expanded part 27a and 27'a respectively, whose forward edges project a small distance along the respective side-faces of the cylinder 23 with a narrow clearance.

In practice the apparatus according to the invention functions in the following way:

As previously mentioned the bales are transported in a continuous row on the conveyor 2. During the transport the bales are carried in their most stable position, that is lying on one of its two larger sidefaces and such that the bale layers or slabs C' are resting horizontally above each other. By this arrangement the bale layers are prevented from falling apart when the bales are transported on the conveyor. When the first bale C in a row engages a bale stop 5 on the wagon 4 a switch (not shown) interrupting the operation of the conveyor 2 is activated, after which the separating wagon 4, for instance by means of a hydraulic cylinder (not shown), is moved a short distance forward in continuation of the conveyor 2, such that the first bale C is parted from the next one and is situated direct above the tilting arms 6 and 6' lowered into their first position between the rolls 4a on the wagon 4. Plus motion of the piston rod 12a causes the tilting arms to rotate 90° to their second position where the arms 7 and 7' are horizontally situated flush with the top surface of the roller conveyor 14. During this movement the bale C is lifted from its position where the layers or slabs are horizontally oriented, and is placed on the conveyor 14 with the slabs vertically oriented, as also the bale is rotated 90°. The angle between the arms 6,6' and 7,7' is suitably made larger than a right angle in order to secure that the bale will be released from the arms 6 and 6' before further transportation.

When the piston rod 13a of the hydraulic cylinder 13 is activated in the plus direction the conveyor 14 is lifted into alignment with the conveyor 15, causing the bale C to slide by gravity down the conveyors 14 and 15 on their free rollers, until the bale stops against the rear end of the preceding bale which is clamped between the clamping plates 17 and 17'. When moving on the conveyors 14 and 15 the bale is guided by guiding rails 31 and 31' arranged parallelly on each side above the conveyors, such guiding rails also preventing the bale layers from falling apart. The clamping arms 16 and 16' are now moved towards the shredder cylinder 23 under the action of the hydraulic cylinder 21 as previously described. When the clamping arms reach their inner end position as illustrated in FIG. 2, the hydraulic cylinder 19 in the lower end of the arms are activated to perform a minus motion such that the clamping plates 17 and 17' are disengaged from the sides of the bale. At the same time the cylinder 21a starts its minus motion and moves the clamping arms 16 and 16' with plates 17 and 17' to their opposite end position (left clamp plate position indicated in FIG. 2). Then the cylinder 19 is activated for plus motion so that the clamping plates 17 and 17' clamp the rear part of the bale C which is now located between them, as it has followed the preceding bale under the action of gravity when the latter was pressed against the shredder cylinder 23 by the clamps. The hydraulic cylinder 21 now starts its plus motion, whereby the bale C which is held between the clamps presses the remaining part of the preceding bale against the rotating shredder cylinder 23 so that the latter is disintegrated at a rate corresponding to the velocity of the clamps under the action of the cylinder 21. During the final shredding the remaining part of the bale is guided and held together by the guide plates 27 and 27', supported on the supporting plate 22.

The front end of the subsequent bale enters between the guide plates and eventually reaches the shredder cylinder when the disintegration of the preceding bale is substantially completed. The feeding of the bale C against the cylinder 23 then continues without any break under the action of the clamps until the latters reach their inner end position, when the bale is released from the clamps which return to their outer end position as previously described and clamp the next bale which in the meantime is introduced in the apparatus in the above explained manner, after which the sequence is repeated. The control of the various movements during the transport and feeding of the bale may be effected by means of limit switches, time switches, photo cells, etc. These switches etc. are not shown on the drawings and they are not described in detail. They may be of known common construction and do not constitute any part of the invention.

Figure 6:
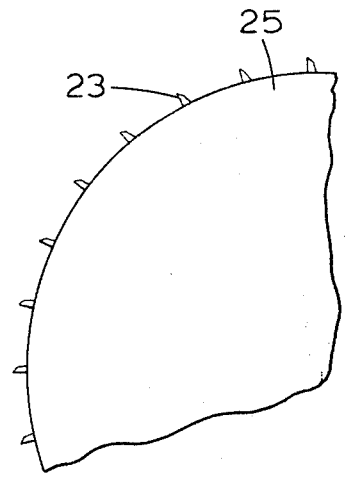
FIG. 6 is a detailed fractional view of the shredding cylinder to be used in the apparatus according to this invention.

The rotational direction of the shredder cylinder 23 as indicated by an arrow in FIG. 2, is such that the shredder teeh 25 (FIG. 6) are moving downwards during their contact with the bale front. The subdivided fibre material C'' from the bales is thus carried with the rotating cylinder past the supporting plate 22 and then falls onto a sloping baffle plate 32 from which it slides down into a vertical hopper 33 which suitably may be led through the floor 40, such that the subdivided pulp may fall direct into the underlying equipment 34 for further treatment (FIG. 1). Alternatively the fiber material may be carried to the treatment plant on a conveyor 35 located under the hopper opening, or it may be removed by means of a pneumatic transport system 36, the hopper opening then being closed while the pulp by suction flows through openings 37 in the lower part of the casing 1a. As previously described the shredder teeth 25 may be arranged on the cylinder 23 in a double helical pattern. The helical pitch and the tooth width may be interrelated in such a way that the teeth overlap each other axially of the cylinder in order to avoid dead zones and to ensure that the entire cross section of the bale is shredded. As illustrated in FIG. 6 the shredder teeth may have a triangular shape radially projecting from the cylinder surface, with a flat surface attacking the bale material. Hence the teeth do not cut into the bale, but penetrate it and tear out small pieces. The size of the pieces may be varied by regulating the speed of rotation of the shredder cylinder and/or the bale feed velocity. The upper and lower triangular bale remainders which are formed when the shredding of a bale is almost completed, are unravelled or split laterally only just before the next bale contacts the shredder cylinder, as a result of the shredder teeth penetrating the fiber material in the split direction of the bale. Thus a "soft" transition from one bale to the next is obtained and hard wedges are avoided which otherwise might get stuck between the cylinder 23 and the supporting plate 22 or at other places in the apparatus.

By normal operation the bales expand during the shredding process in a region close to the shredder cylinder, as a result of the penetrating action of the teeth. It is important that this expansion is allowed to take place freely, as this promotes the shredding. Furthermore a prevention of the bale expansion would lead to wedging between the guide plates 27 and 27', as the splitting effect is particularly strong during the last phase of the shredding of a bale. In order to make room for this expansion, as previously described the guide plates 27 and 27' are formed with laterally bent portions 27a and 27'a, such that on each side of the leading bale adjacent the shredder cylinder is formed an open space or expansion chamber 28 and 28' (FIG. 5), defined by the bale side, the guide plate, the supporting plate and the cylinder surface, absorbing the expansion.

As the bale weight may vary up to 20 percent it is necessary to be able to vary the velocity with which the bales are fed against the shredder cylinder in order to obtain a constant discharge rate of subdivided pulp. This control of the feed velocity may be obtained in a simple manner by installing a control valve of general type in the oil circuit to the feed cylinder 21.

We claim:

1. An apparatus for shredding bales composed of a plurality of relatively loosely adhering slabs of compactly pressed fiber material, such as flash dried wood pulp, the fibers of said fiber material having a split direction substantially parallel to the interfaces between said slabs, said apparatus comprising:

a rotating cylinder having shredding teeth on the periphery thereof;

conveyor means for passing said bales along a bale path to a position adjacent said shredding teeth, said bales being located with said split direction transverse to the plane of said conveyor means;

guide means positioned on opposite lateral sides of said conveyor means for guiding said bales along a portion of said bale path adjacent said shredding teeth; and clamping means mounted with respect to said conveyor means for clamping opposite lateral sides of a bale in a clamping direction transverse to said bale path and parallel to the longitudinal axis of said cylinder and for forcibly feeding said thus clamped bale along said bale path into contact with said shredding teeth, whereby said shredding teeth penetrate said bale in a direction parallel to said split direction and shred said bale.

2. An apparatus as claimed in claim 1, wherein said clamping means comprises a pair of clamping arms, one positioned on each opposite lateral side of said conveyor means; first drive means connected to said clamping arms for causing said clamping arms to move toward each other in said clamping direction to clamp therebetween the trailing portion of a first bale which abuts a remaining portion of a second bale which is in contact with said shredding teeth and which is substantially shredded; second drive means connected to said clamping arms for moving said clamping arms and said thus clamped first bale along said bale path toward said shredding teeth, and for forcing said remaining portion of said second bale against said shredding teeth, until a position at which said remaining portion of said second bale and a substantial portion of said first bale are shredded, thereby leaving a remaining unshredded portion of said first bale; said first drive means thereafter being operable to move said clamping arms away from each other to release said remaining unshredded portion of said first bale; and said second drive means thereafter being operable to move said clamping arms along said bale path away from said shredding teeth to a position adjacent the trailing portion of a third bale which abuts said remaining unshredded portion of said first bale.

3. Apparatus according to claim 1, wherein said clamping direction of said clamping means and said axis of said cylinder are horizontally oriented transversally to said bale path.

4. Apparatus according to claim 3, further comprising tilting means associated with said conveyor means for successively rotating each said bale from a first position where said slab interfaces thereof are horizontally oriented, to a second position where said slab interfaces are vertically oriented, before each said bale is fed to the clamping means.

5. Apparatus according to claim 4, wherein said conveyor means further comprises a sloping roller conveyor having free rollers on which said bales under the action of gravity are fed from said tilting means to said clamping means, the slabs of said bales being prevented from falling apart by guiding rails positioned along the conveyor means.

6. Apparatus according to claim 1, wherein said guide means comprises two guide plates each having a laterally bent part positioned adjacent said cylinder, such that expansion chambers are formed which receive the expansion of the bale in the shredding zone.

7. Apparatus according to claim 2, wherein said first and second drive means are hydraulic cylinders.

8. Apparatus according to claim 1, wherein said shredding teeth are mounted along at least one helical line on said periphery of said cylinder surface, said teeth overlapping each other axially of said cylinder.

9. Apparatus according to claim 8, wherein said teeth each have a flat attacking surface normal to the surface of said cylinder.

* * * * *